(12) United States Patent
Hetrick et al.

(10) Patent No.: US 9,703,645 B2
(45) Date of Patent: Jul. 11, 2017

(54) DATA RECOVERY TECHNIQUE FOR RECOVERING DATA FROM AN OBJECT STORAGE SERVICE

(71) Applicant: NetApp, Inc., Sunnyvale, CA (US)

(72) Inventors: William Hetrick, Eastbrorough, KS (US); Dennis James Hahn, Wichita, KS (US); Pradeep Ganesan, Boulder, CO (US); Sarat Chandra Ogirala, Wichita, KS (US)

(73) Assignee: NetApp, Inc., Sunnyvale, CA (US)

( * ) Notice: Subject to any disclaimer, the term of this patent is extended or adjusted under 35 U.S.C. 154(b) by 154 days.

(21) Appl. No.: 14/523,550

(22) Filed: Oct. 24, 2014

(65) Prior Publication Data

US 2016/0117227 A1  Apr. 28, 2016

(51) Int. Cl.
*G06F 11/00* (2006.01)
*G06F 11/14* (2006.01)

(52) U.S. Cl.
CPC ...... *G06F 11/1469* (2013.01); *G06F 11/1451* (2013.01); *G06F 2201/835* (2013.01)

(58) Field of Classification Search
CPC .................. G06F 11/1451; G06F 11/1469
See application file for complete search history.

(56) References Cited

U.S. PATENT DOCUMENTS 6,397,308 B1 * 5/2002 Ofek ............... G06F 11/1451
707/999.202
2006/0047997 A1 * 3/2006 Anderson ......... G06F 11/1471
714/4.1
2007/0055833 A1 * 3/2007 Vu .................. G06F 11/1469
711/162
2009/0313503 A1 * 12/2009 Atluri ............. G06F 11/1453
714/19
2012/0123999 A1 * 5/2012 Ashutosh ......... G06F 11/1453
707/618
2012/0203742 A1 * 8/2012 Goodman ........ G06F 11/1469
707/646
2012/0324280 A1 * 12/2012 Wang ............... G06F 11/1417
714/15
2015/0127612 A1 * 5/2015 Balcha ............. G06F 11/1451
707/645
2015/0370644 A1 * 12/2015 Graefe ............. G06F 11/1466
707/624
2016/0077920 A1 * 3/2016 Regni .............. G06F 17/30575
707/649

* cited by examiner

*Primary Examiner* — Michael Maskulinski
(74) *Attorney, Agent, or Firm* — Haynes and Boone, LLP

(57) ABSTRACT

A system and method for recovering data backed up to an object store are provided. In some embodiments, the method includes identifying an address space of a data set to be recovered. A set of data objects stored by an object-based system is identified that corresponds to the address space and a selected recovery point. The identified set of data objects is retrieved, and data contained in the retrieved set of data objects is stored to at least one storage device at a block address determined by the retrieved set of data objects to recreate the address space. In some embodiments, the set of data objects is retrieved by providing an HTTP request and receiving the set of data objects as an HTTP response. In some embodiments, the set of data objects are retrieved based on the data objects being the target of a data transaction.

20 Claims, 8 Drawing Sheets

400

| Data Extent | Recovery Point T0 | Recovery Point T1 | Recovery Point T2 | Recovery Point T3 | Recovery Point T4 |
|---|---|---|---|---|---|
| 00000-00999 | --- | 00000_T1 | 00000_T2 | 00000_T3 | 00000_T4 |
| 01000-01999 | 01000_T0 | --- | 01000_T2 | 01000_T3 | 01000_T4 |
| 02000-02999 | 02000_T0 | --- | 02000_T2 | --- | --- |
| 03000-03999 | 03000_T0 | 03000_T1 | --- | 03000_T3 | --- |
| 04000-04999 | 04000_T0 | --- | 04000_T2 | 04000_T3 | 04000_T4 |
| 05000-05999 | 05000_T0 | 05000_T1 | 05000_T2 | --- | --- |
| 06000-06999 | 06000_T0 | --- | --- | --- | 06000_T4 |
| 07000-07999 | 07000_T0 | --- | 07000_T2 | 07000_T3 | --- |

204

| Data Extent | Recovery Point T0 | Recovery Point T1 | Recovery Point T2 | Recovery Point T3 | Recovery Point T4 |
|---|---|---|---|---|---|
| 00000-00999 | --- | 00000_T1 | 00000_T2 | 00000_T3 | 00000_T4 |
| 01000-01999 | 01000_T0 | --- | 01000_T2 | 01000_T3 | 01000_T4 |
| 02000-02999 | 02000_T0 | --- | 02000_T2 | --- | --- |
| 03000-03999 | 03000_T0 | 03000_T1 | --- | 03000_T3 | --- |
| 04000-04999 | 04000_T0 | --- | 04000_T2 | 04000_T3 | 04000_T4 |
| 05000-05999 | 05000_T0 | 05000_T1 | 05000_T2 | --- | --- |
| 06000-06999 | 06000_T0 | --- | --- | --- | 06000_T4 |
| 07000-07999 | 07000_T0 | --- | 07000_T2 | 07000_T3 | --- |

DATA RECOVERY TECHNIQUE FOR RECOVERING DATA FROM AN OBJECT STORAGE SERVICE

CROSS-REFERENCE TO RELATED APPLICATIONS

This application is related to U.S. application Ser. No. 14/521,053, filed on even date herewith, by William Hetrick, et al., entitled "DATA BACKUP TECHNIQUE FOR BACKING UP DATA TO AN OBJECT STORAGE SERVICE", which is incorporated herein by reference in its entirety.

TECHNICAL FIELD

The present description relates to data backup, and more specifically, to a system and method for restoring data from an object-based storage system.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers in order to provide data and manage its flow. Improvements in distributed storage have given rise to a cycle where applications demand increasing amounts of data delivered with reduced latency, greater reliability, and greater throughput. Hand-in-hand with this trend, system administrators have taken advantage of falling storage prices to add capacity wherever possible.

However, one drawback to this abundance of cheap storage is the need to maintain regular backup copies of increasing amounts of data. Even though storage devices have become more reliable, they are not infallible. When multiple storage devices are grouped in a RAID array or other grouping, the probability of failure increases with each storage device added. While many RAID configurations offer redundancy such as parity or mirroring, it is still possible for a catastrophic failure to exceed the ability of the array to recover. Furthermore, RAID and other hardware redundancy safeguards offer no protection from user errors and accidentally deleted files.

Accordingly, a need exists for ample low-cost storage space to use for data backups. One possibility is cloud-based storage service. Cloud computing providers deliver access to computing resources and data storage over a network, providing affordable, location-independent access. However, techniques for storing data in a cloud-based system may not be directly compatible with techniques for storing data in a conventional computing system. Thus, while existing techniques for data backups have been generally adequate, the techniques described herein provide a greater range of backup options that leverage the easy access and affordability of cloud storage as a backup solution.

BRIEF DESCRIPTION OF THE DRAWINGS

The present disclosure is best understood from the following detailed description when read with the accompanying figures.

FIG. 4 is a memory diagram of the contents of an object store of an object-based backup system according to aspects of the present disclosure.

DETAILED DESCRIPTION

Figure 1:
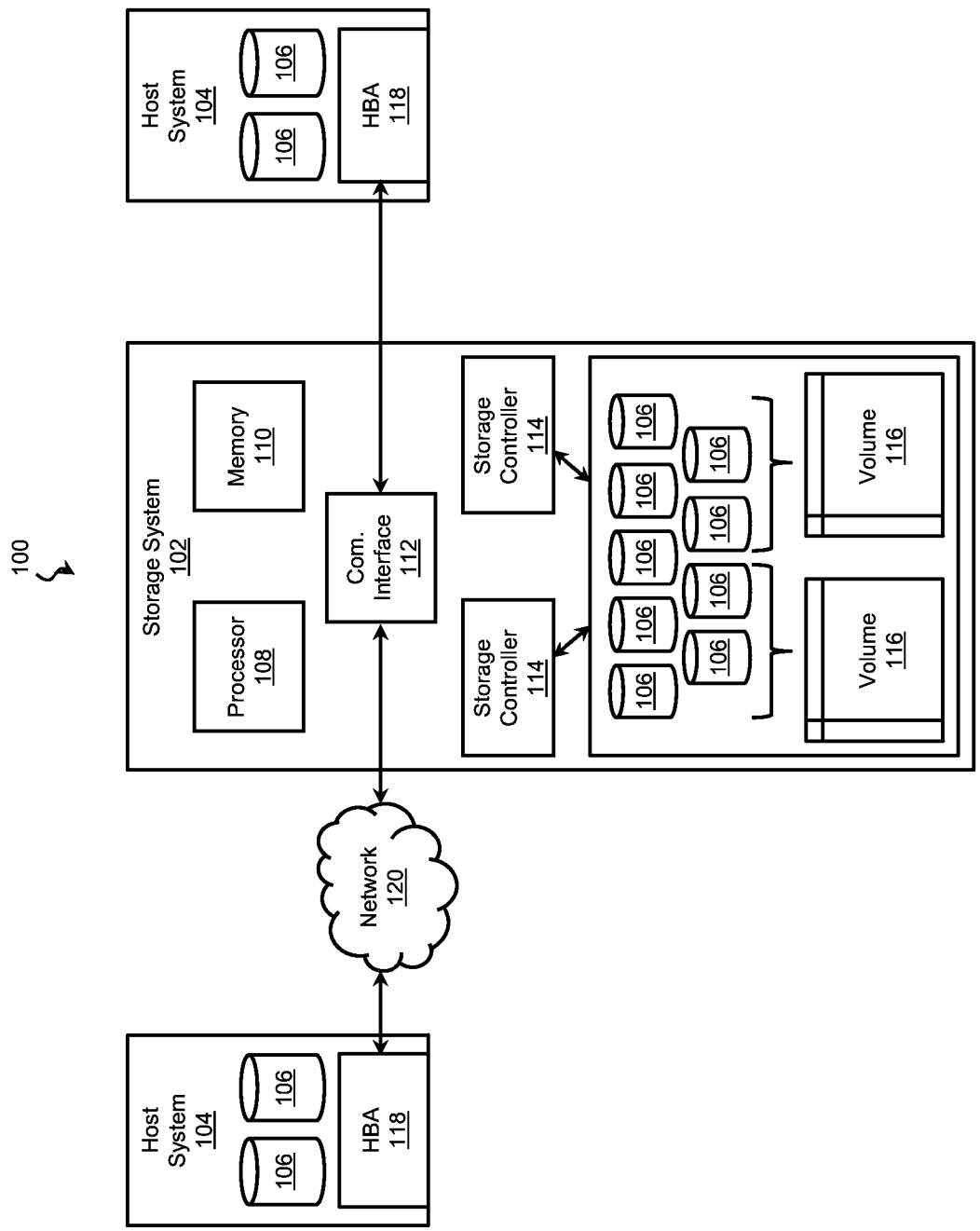
FIG. 1 is a schematic diagram of a computing architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and computer programs for recovering backup data from an object storage service. In an exemplary embodiment, a recovery module running on a host or a storage system receives a request to recover data. In turn, the recovery module transmits a request over the Internet or other network for a list of recovery objects stored by an object store. Based on the received list, the recovery module determines the recovery objects that correspond to the underlying data using address ranges and/or other identifiers. The recovery module may also determine the available recovery points, points in time at which the specified data can be reconstructed. The recovery module presents a list of available recovery points and a list of quality-of-service to options to the user or program that requested that the data be restored.

In addition to the recovery point and the quality-of-service options, the recovery module may also present the option to perform a complete recovery of the data or an on-demand recovery. On-demand recovery recognizes that the connection to the data recovery system may be relatively slow and that sometimes only a small subset of the recovered data is actually used. Accordingly, in an example of an on-demand recovery, a recovery module initializes a recovery proxy on a storage system, host, or other computing system. The proxy receives data transactions directed to the recovered data set and, if this is the first access of the requested data, the proxy retrieves the corresponding recovery objects from the data storage system. The proxy caches the retrieved data to a local storage device for use in performing subsequent transactions. Because the proxy only retrieves data from the data recovery system when it is requested, overhead is greatly reduced. Even though individual transaction latency may be increased the first time data is accessed, data transactions can be issued before the recovery process completes, thereby improving performance.

FIG. 1 is a schematic diagram of a computing architecture 100 according to aspects of the present disclosure. The computing architecture 100 includes a number of computing systems, including one or more storage systems 102 and one or more host systems 104 (hosts), each of which may store and manipulate data. Techniques for preserving and restoring this data are described with reference to the figures that follow.

In the illustrated embodiment, the computing architecture 100 includes one or more storage systems 102 in communication with one or more hosts 104. It is understood that for clarity and ease of explanation, only a single storage system 102 and a limited number of hosts 104 are illustrated, although the computing architecture 100 may include any number of hosts 104 in communication with any number of storage systems 102. An exemplary storage system 102 receives data transactions (e.g., requests to read and/or write data) from the hosts 104 and takes an action such as reading, writing, or otherwise accessing the requested data so that storage devices 106 of the storage system 102 appear to be directly connected (local) to the hosts 104. This allows an application running on a host 104 to issue transactions directed to storage devices 106 of the storage system 102 and thereby access data on the storage system 102 as easily as it can access data on the storage devices 106 of the host 104. In that regard, the storage devices 106 of the storage system 102 and the hosts 104 may include hard disk drives (HDDs), solid state drives (SSDs), RAM drives, optical drives, and/or any other suitable volatile or non-volatile data storage medium.

While the storage system 102 and the hosts 104 are referred to as singular entities, a storage system 102 or host 104 may include any number of computing devices and may range from a single computing system to a system cluster of any size. Accordingly, each storage system 102 and host 104 includes at least one computing system, which in turn includes a processor 108 such as a microcontroller or a central processing unit (CPU) operable to perform various computing instructions. The computing system may also include a memory device 110 such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface 112 such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

With respect to the storage system 102, the exemplary storage system 102 contains any number of storage devices 106 in communication with one or more storage controllers 114. The storage controllers 114 exercise low-level control over the storage devices 106 in order to execute (perform) data transactions on behalf of the hosts 104, and in so doing, may group the storage devices for speed and/or redundancy using a virtualization technique such as RAID (Redundant Array of Independent/Inexpensive Disks). At a high level, virtualization includes mapping physical addresses of the storage devices into a virtual address space and presenting the virtual address space to the hosts 104. In this way, the storage system 102 represents the group of devices as a single device, often referred to as a volume 116. Thus, a host 104 can access the volume 116 without concern for how it is distributed among the underlying storage devices 106.

Turning now to the hosts 104, a host 104 includes any computing resource that is operable to exchange data with a storage system 102 by providing (initiating) data transactions to the storage system 102. In an exemplary embodiment, a host 104 includes a host bus adapter (HBA) 118 in communication with a storage controller 114 of the storage system 102. The HBA 118 provides an interface for communicating with the storage controller 114, and in that regard, may conform to any suitable hardware and/or software protocol. In various embodiments, the HBAs 118 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire. In many embodiments, the host HBAs 118 are coupled to the storage system 102 via a network 120, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. To interact with (e.g., read, write, modify, etc.) remote data, the HBA 118 of a host 104 sends one or more data transactions to the storage system 102 via the network 120. Data transactions may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information.

Thus, a user of the exemplary computing architecture 100 may have data stored on one or more hosts 104 as well as on the storage system 102. In order to preserve this data, backup copies may be made at regular intervals and preserved in a state such that they can be restored later. In many embodiments, the backup copies are stored on different storage devices 106 and/or different computing systems to protect against a single point of failure compromising both the original and the backup. Any suitable backup technique may be used to preserve the data on the storage devices 106 of the hosts 104 and/or storage system 102. One such technique involves backing up data to an object storage service and is disclosed in U.S. patent application Ser. No. 14/521,053, filed on even date herewith, by William Hetrick et al., entitled "DATA BACKUP TECHNIQUE FOR BACKING UP DATA TO AN OBJECT STORAGE SERVICE", the entire disclosure of which is herein incorporated in its entirety.

Figure 2:
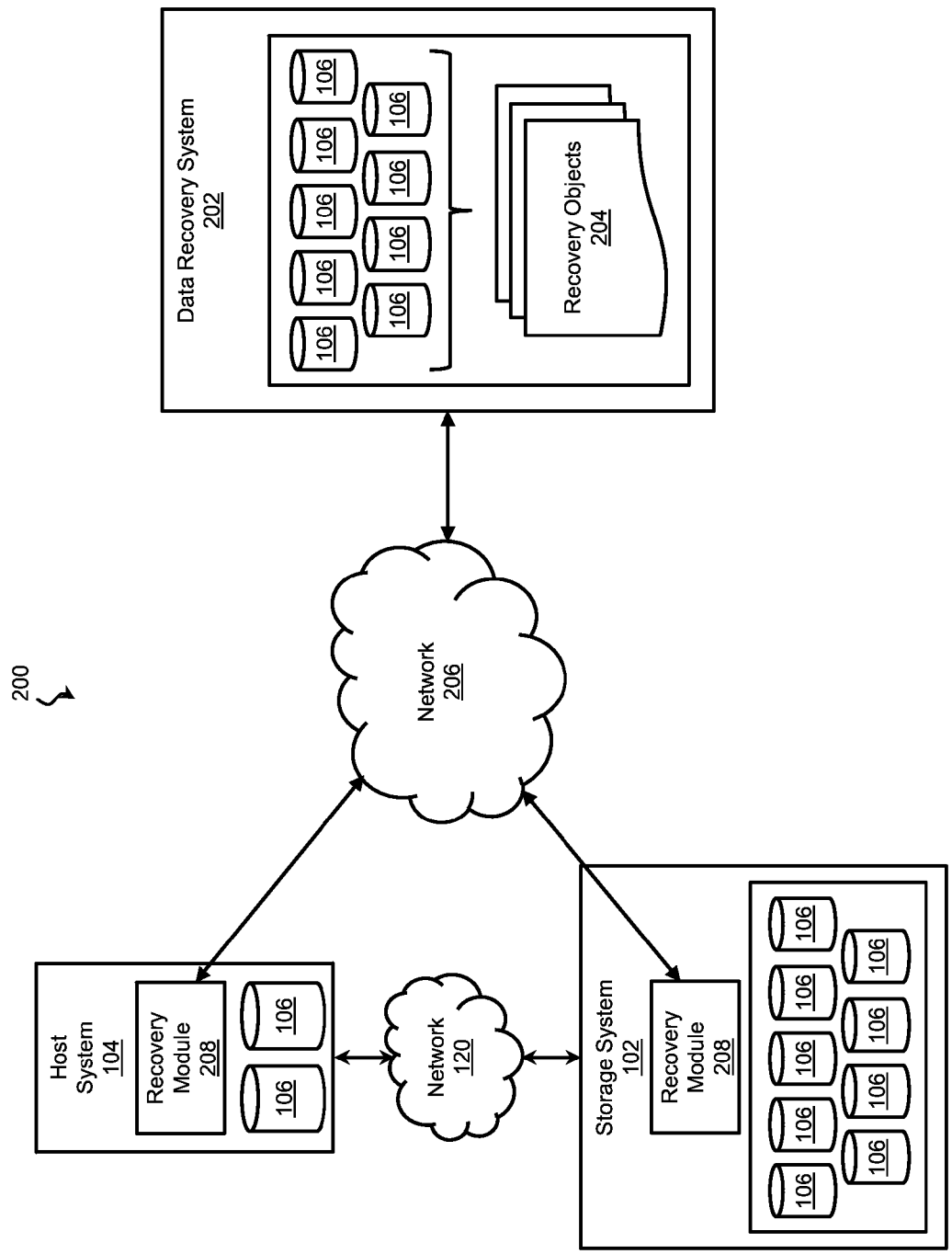
FIG. 2 is a schematic diagram of a computing architecture including an object-based backup system according to aspects of the present disclosure.
Figure 5:
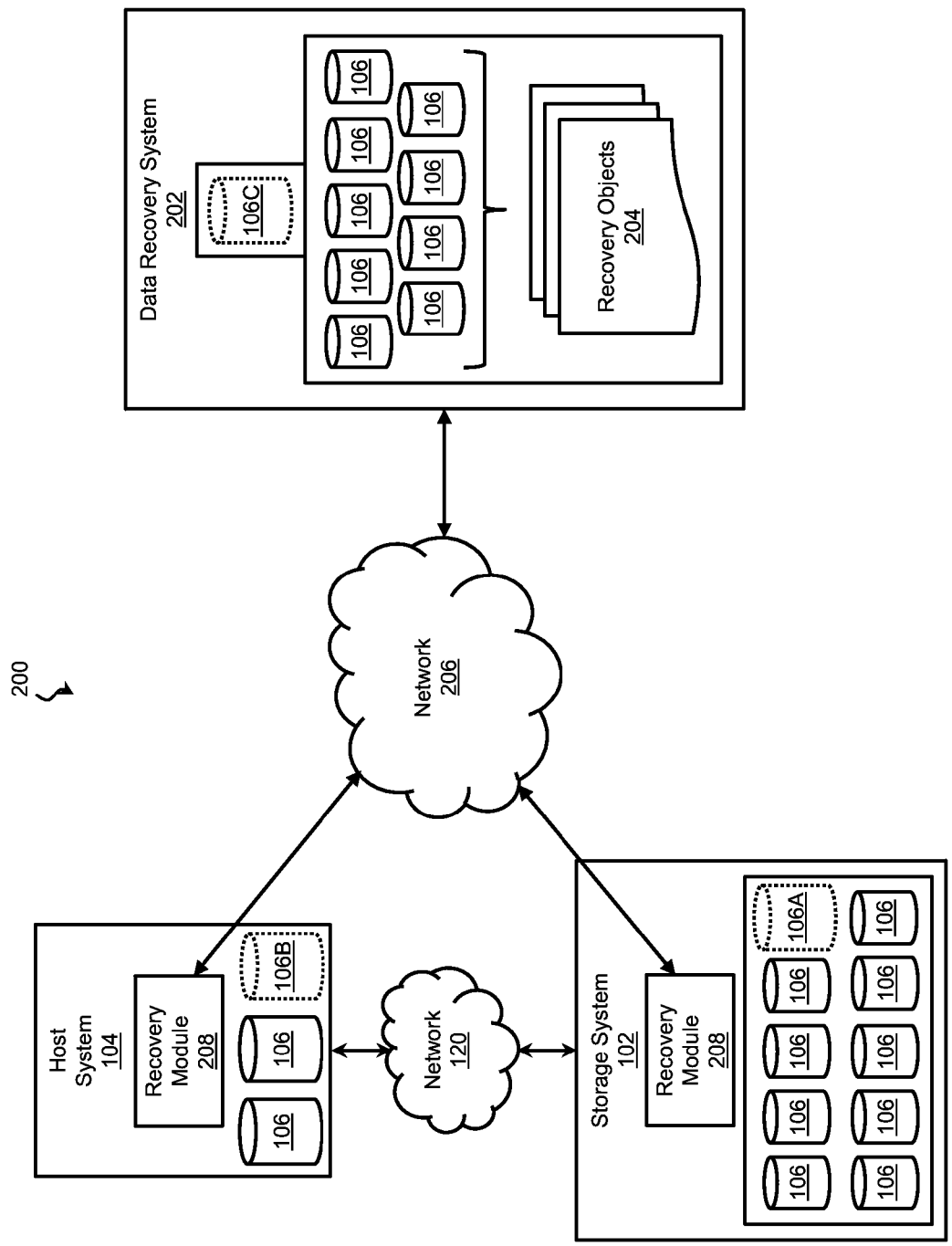
FIG. 5 is a schematic diagram of the computing architecture undergoing the method of restoring data according to aspects of the present disclosure.

An exemplary technique for restoring data from an object data store is disclosed with reference to FIGS. 2 through 5. FIG. 2 is a schematic diagram of a computing architecture 200 including an object-based backup system according to aspects of the present disclosure. FIGS. 3A and 3B are flow diagrams of a method 300 of restoring data from an object-based backup system according to aspects of the present disclosure. It is understood that additional steps can be provided before, during, and after the steps of method 300, and that some of the steps described can be replaced or eliminated for other embodiments of the method. FIG. 4 is a memory diagram of the contents of an object store 400 of an object-based backup system according to aspects of the present disclosure. FIG. 5 is a schematic diagram of the computing architecture 200 undergoing the method 300 of restoring data according to aspects of the present disclosure.

Referring first to FIG. 2, the illustrated computing architecture 200 may be substantially similar to the computing architecture 100 of FIG. 1 in many aspects and may include one or more hosts 104 and storage systems 102, each substantially similar to those of FIG. 1. The host(s) 104 and storage system(s) 102 are communicatively coupled to a data recovery system 202, which contains backup copies of data obtained from a host 104 and/or a storage system 102. The data recovery system 202 may be an object-based data system and may store the backup data as one or more recovery objects 204.

In brief, object-based data systems provide a level of abstraction that allows data of any arbitrary size to be specified by an object identifier. In contrast, block-level data transactions refer to data using an address that corresponds to a sector of a storage device and may include a physical address (i.e., an address that directly map to a storage device) and/or a logical address (i.e., an address that is translated into a physical address of a storage device). Exemplary block-level protocols include iSCSI, Fibre Channel, and Fibre Channel over Ethernet (FCoE). As an alternative to block-level protocols, file-level protocols specify data locations by a file name. A file name is an identifier within a file system that can be used to uniquely identify corresponding memory addresses. File-level protocols rely on a computing system to translate the file name into respective storage device addresses. Exemplary file-level protocols include CIFS/SMB, SAMBA, and NFS. Object-level protocols are similar to file-level protocols in that data is specified via an object identifier that is eventually translated by a computing system into a storage device address. However, objects are more flexible groupings of data and may specify a cluster of data within a file or spread across multiple files. Object-level protocols include CDMI, HTTP, SWIFT, and S3.

Accordingly, in an example, the data recovery system 202 communicates with the host(s) 104 and the storage system(s) 102 using HTTP, an object-level protocol, over a network 206, which may be substantially similar to network 120. In that regard, network 206 may include any number of wired and/or wireless networks such as a LAN, an Ethernet subnet, a PCI or PCIe subnet, a switched PCIe subnet, a WAN, a MAN, the Internet, or the like, and may be part of network 120 or may be a completely different network. In the example, network 120 is an intranet (e.g., a LAN or WAN), while network 206 is the Internet.

As with the host 104 and the storage system 102, while the data recovery system 202 is referred to as a singular entity, it may include any number of computing devices and may range from a single computing system to a system cluster of any size. Accordingly, the data recovery system 202 includes at least one computing system, which in turn includes a processor, a memory device, a video controller such as a graphics processing unit (GPU), a communication interface, and/or a user I/O interface. The data recovery system 202 also contains one or more storage devices 106 having recovery objects 204 stored thereupon. Either or both of the host 104 and the storage system 102 may recover backup data using the recovery objects 204, and accordingly, the host 104 and/or the storage system 102 may contain a recovery module 208 in communication with the data recovery system 202 to direct the recovery process.

One such recovery process is described with reference to blocks 302-338 of FIGS. 3A and 3B. The data to be recovered during the recovery process is stored on the data recovery system 202, and being object-based, the data recovery system may store one or more recovery objects 204, each containing data stored in various block ranges (data extents) of an address space. The data recovery system may also store recovery objects 204 containing configuration data, as described in more detail below. In the method that follows, these recovery objects 204 are used to reconstruct the block ranges of the address space, thus performing a block-based recovery of a specified set of data.

Figure 3A:
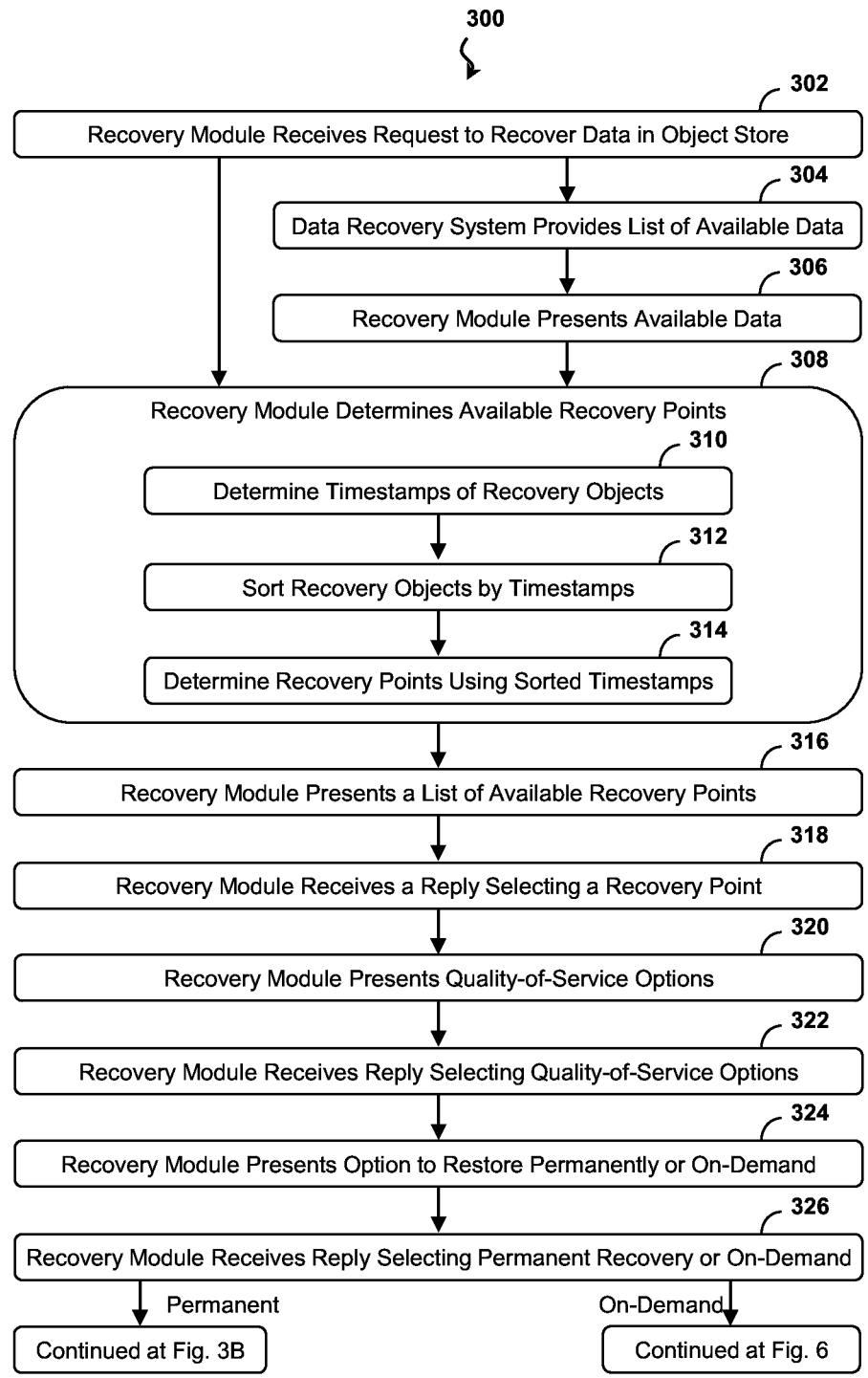
FIGS. 3A and 3B are flow diagrams of a method of restoring data from an object-based backup system according to aspects of the present disclosure.

Referring first to block 302 of FIG. 3A and referring still to FIG. 2, a recovery module 208 of a host 104, a storage system 102, or a third-party system receives a request to recover data. The request may be a user request or an automated request and may be provided by a user, another program, or any other suitable source. The request may identify the data to be recovered and/or may request a list of data available for recovery on the data recovery system 202. In various embodiments, the request identifies data to be recovered by volume, block range, filename, metadata, and/or other suitable identifier. In some such embodiments, the request includes a search term such as a regular expression (REGEXP) to be used by the recovery module 208 to search the recovery objects 204 to identify a subset thereof.

Referring to block 304 of FIG. 3A, when the request received by the recovery module 208 does not uniquely identify data to be recovered, the recovery module 208 determines the available data that matches the request by retrieving information about the recovery objects 204 from the data recovery system 202. As with all exchanges between the recovery module 208 and the data recovery system 202, the request for information and the response may take any suitable format. In an exemplary embodiment where the computing system having the recovery module 208 is communicatively coupled to the data recovery system 202 by an Internet Protocol Suite (IPS)-type network 206, these communications take the form of HTTP requests (e.g., GET, POST, PUT, etc.) transmitted over the network 206.

The recovery module 208 may use object names, metadata, other objects, and other suitable information to identify data available for recovery. In an example that utilizes object names, some recovery objects 204 have names containing a volume identifier, a block range identifier, a timestamp, and/or other suitable information. In order to identify data for recovery, the recovery module requests and receives a list of object names from the data recovery system 202 and parses the object names for the relevant identifiers. In an example that utilizes metadata, some recovery objects 204 have associated metadata such as a volume alias, volume size, RAID status, thin-provision status, data encryption information, permissions, and/or other suitable metadata. The metadata may be stored as part of the respective recovery object 204 and/or in a separate recovery object 204. In some such examples, in order to identify data for recovery, the recovery module 208 obtains and searches this metadata based on one or more search terms in the request.

Once the available data has been determined, referring to block 306 of FIG. 3A, the recovery module 208 presents the list of data available for recovery. The list may be provided at a user interface, an application interface, and/or other suitable interface. The recovery module 208 then receives a second request that uniquely identifies data to be recovered. The second request of block 306 may be substantially similar to the request of block 302, and in various embodiments, the second request identifies data to be recovered by volume, block range, filename, metadata, and/or other suitable identifier.

Referring to block 308 of FIG. 3A, the recovery module 208 determines available recovery points for the selected data. The recovery points correspond to points in time at which the data was copied to the data recovery system 202 and represent the data as it existed at the respective points in time. In some embodiments, the data recovery system 202 stores a recovery object 204 that contains a list of recovery points in a data structure. In such embodiments, the data structure may take the form of a linked list, a tree, a table such as a hash table, an associative array, a state table, a flat file, a relational database, and/or other suitable memory structure, and may be stored in a recovery point data object 204 or elsewhere in the data recovery system 202. In some such embodiments, the recovery module 208 determines the available recovery points by retrieving the recovery point object 204 and parsing the data structure.

Additionally or in the alternative, the recovery module 208 may determine the recovery points from the backup-data-containing recovery objects 204. One suitable technique for parsing recovery objects 204 is described with reference to blocks 310-312. Referring to block 310 of FIG. 3A, the recovery module 208 determines the timestamp associated with each recovery object 204 of the requested data to be recovered. In some examples, timestamps are incorporated into the name of each recovery object 204, and the recovery module 208 analyzes the list of recovery objects 204 to determine the timestamps. In some examples, timestamps are incorporated into metadata stored in each recovery object 204, and the recovery module 208 retrieves the metadata to determine the timestamps. In some examples, timestamps are kept in a separate, but corresponding, recovery object 204.

Based on the timestamps, the recovery module 208 determines recovery points for which the complete set of the requested data can be restored. For example, referring to block 312 of FIG. 3A, the recovery module 208 sorts the recovery objects 204 of the requested data by timestamp. Referring to block 314 of FIG. 3A, the recovery module 208 determines valid recovery points based on those points in time where the complete address range of the requested data is available in recovery objects 204 having a timestamp matching the recovery point or earlier. Instead, the most recent previous recovery object 204 remains valid until it is replaced.

A simple example is explained with reference to FIG. 4. The memory diagram 400 of FIG. 4 shows the recovery objects stored in the data recovery system 202 corresponding five points in time, T0-T4, with T0 being the earliest. In this example, each storage object is named based on a corresponding block range and timestamp. The data recovery system 202 supports incremental backups where unchanged data is not duplicated with a new timestamp.

A request is received for data blocks 00000-03999 in blocks 302 and/or 306. The recovery module 208 determines the timestamps associated with the recovery objects 204 from a list of object names as described in block 310. The recovery module 208 sorts the timestamps as described in block 312. The recovery module 208 then determines those points in time where the complete address range of the requested data (in an example, blocks 00000-03999) can be restored. As explained in block 314, a valid recovery point is one in which the complete set of the requested data is available with a timestamp matching the recovery point or earlier. In the example, T0 is not a valid recovery point because it does not have a recovery object 204 corresponding to data extent 00000-00999 with a timestamp matching the recovery point or older. In contrast T1 is a valid recovery point because the data at time T1 can be reconstructed from recovery objects {00000_T1, 01000_T0, 02000_T0, and 03000_T1}, which correspond to the most recent recovery objects 204 having a timestamp matching the recovery point or earlier.

Once the available recovery points are determined in block 308, referring to block 316, the recovery module 208 provides a list of the available recovery points. The list may be provided at a user interface, an application interface, and/or other suitable interface. Referring to block 318 of FIG. 3A, the recovery module 208 receives a response to the data recovery system 202 selecting one of the available recovery points.

Referring to block 320 of FIG. 3A, the recovery module 208 may present a list of Quality-of-Service (QoS) options to select from. QoS options may include storage medium option (e.g., HDD, SDD, RAM drive, etc.), RAID configuration options, thin provisioning options, encryption options, and/or other suitable QoS options. The list may be provided at a user interface, an application interface, and/or other suitable interface. In some embodiments, the recovery module 208 may also present an indication of the QoS configuration of the data when it was backed up. For example, the recovery module 208 may inform a user that the data was originally stored using a particular RAID level or encryption scheme. The recovery module 208 may determine the prior QoS configuration from corresponding metadata of the corresponding recovery objects 204. Referring to block 322 of FIG. 3A, the recovery module 208 receives a selection of one or more of the QoS configuration options.

Referring to block 324 of FIG. 3A, the recovery module 208 may present a user or an application with an option to restore the data permanently or on-demand. On-demand recovery is described in more detail in the context of FIGS. 6 and 7, but at a high level, on-demand data recovery recognizes that transmitting an entire data set can be burdensome and that for many use cases, only a few files of the recovered data set are actually used. Thus, in many embodiments, on-demand recovery sets asides space for recovering the entire data set, but only copies over those portions that are requested in subsequent data transactions. Referring to block 326 of FIG. 3A, the recovery module 208 may receive a response selecting either permanent or on-demand recovery of the data to be recovered.

Figure 3B:
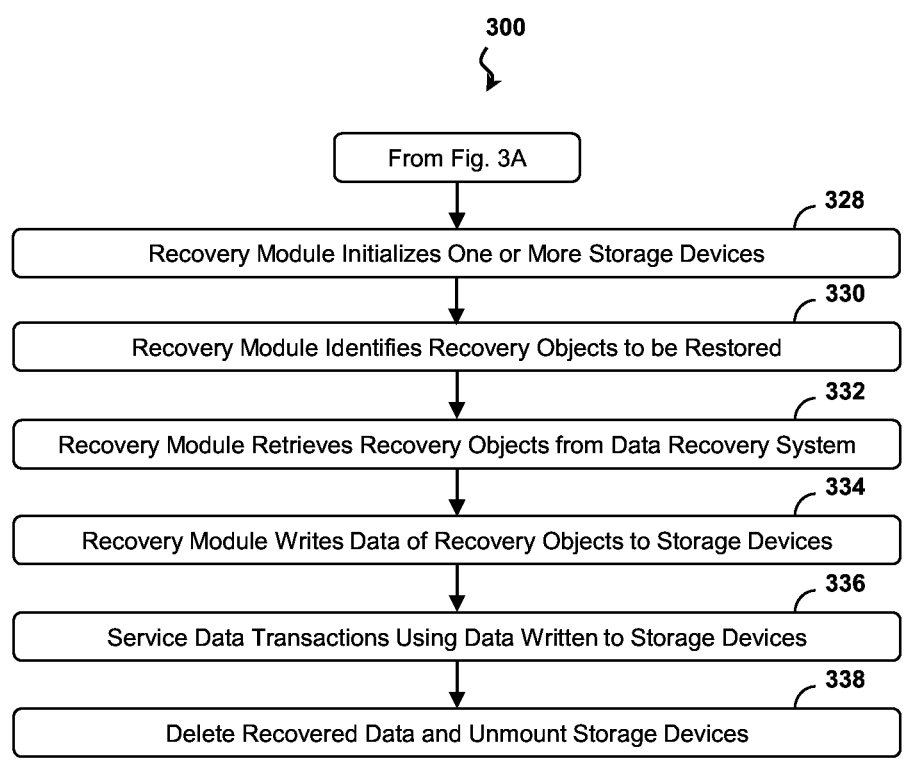

Referring to block 328 of FIG. 3B and to FIG. 5, when a permanent recovery is selected in block 326, the recovery module 208 initializes one or more storage devices 106 upon which to store the restored data. In various examples, the recovery module 208 initializes storage devices 106 that are directly connected to (local to) the storage system 102 (as in the example of storage device 106A), local to the host system 104 (as in the example of the storage device 106B), and/or local to the data recovery system 202 (as in the example of storage device 106C). In some embodiments, the initialized storage devices 106 are local to a different computing system than the system that contains the recovery module 208 performing the recovery technique. For example, in one such embodiment, the recovery module 208 runs on the host 104, while the initialized storage devices 106 are local to the storage system 102. In the course of initializing the storage devices 106, the recovery module 208 may configure the storage devices 106 based on the QoS options selected in block 234 (e.g., storage medium, RAID level, permissions, encryption, etc.). Additionally or in the alternative, the recovery module 208 may configure the storage devices 106 based on a QoS configuration of the data at the time it was backed up irrespective of any selection. For example, the recovery module 208 may impose encryption regardless if the data to be recovered was originally encrypted. The prior QoS configuration may be determined from QoS information recorded in the recovery objects 204.

Referring to block 330 of FIG. 3A, the recovery module 208 identifies those recovery objects 204 corresponding to the address space of the data and the recovery point selected in blocks 302, 306, and/or 318. In an example where the data recovery system 202 maintains a complete set of recovery objects 204 for each recovery point, the recovery module 208 retrieves recovery objects 204 having a timestamp that matches the selected recovery point. In a further example where the data recovery system 202 supports incremental backups, the recovery module 208 retrieves the most recent recovery object 204 with a timestamp matching or older than the recovery point for each address range in the data to be recovered. In such an example, the respective timestamps may be determined based on object names and/or associated metadata. In the example of FIG. 4, recovery objects 204 for recovery point T3 include {00000_T3, 01000_T3, 02000_T2, 03000_T3, 04000_T3, 05000_T2, 06000_T0, and 07000_T3} as these are the most recent recovery objects 204 with a timestamp matching or older than the recovery point. Object 00000_T4 would not be included because the timestamp is more recent than the recovery point time T3. Similarly, object 02000_T0 would not be included because object 02000_T2 has a more recent timestamp that is still less than (older than) time T3.

Once the recovery objects 204 of the recovery point have been identified, referring to block 332 of FIG. 3B, the recovery module 208 retrieves the recovery objects 204 from the data recovery system 202. In some embodiments, the data recovery system 202 encrypts, decrypts, compresses, or uncompresses the recovery objects 204 prior to transmission to the recovery module 208. As with all exchanges between the recovery module 208 and the data recovery system 202, the request may take any suitable format. In an exemplary embodiment, the recovery objects 204 are transmitted to the recovery module 208 using HTTP requests and responses transmitted over the network 206.

Referring to block 334 of FIG. 3B, the recovery module 208 reconstructs the address space by storing the data contained in the recovery objects 204 on the initialized storage devices 106 at block addresses (physical and/or virtual) determined by the data extents of the respective recovery objects 204. In other words, the data is reconstructed at the exact block address it was at when it was backed up using address identifiers incorporated into the recovery objects 204. The recovery module 208 may also store or apply metadata associated with the data to the initialized storage devices 106.

Referring to block 336 of FIG. 3B, the computing system having the initialized storage devices 106 and the reconstructed data may service data transactions directed to the reconstructed data on behalf of any computing system. In that regard, the computing system having the reconstructed data may receive data transactions (e.g., block-level transactions, file-level transactions, object-level transactions including HTTP Representational State Transfer (REST) transactions, or any other suitable transactions) from the host 104, the storage system 102, or any other system; may read, write, or otherwise interact with the recovered data; and may prepare and provide a response to the transaction sender.

Referring to block 338 of FIG. 3B, when the user or application has finished with the recovered data, the recovery module 208 may delete the recovered data and may return the initialized storage devices 106 to the general storage pool. In this way, the computing architecture 200 provides a data recovery technique for recovering a block-level data set using an object data store.

Figure 6:
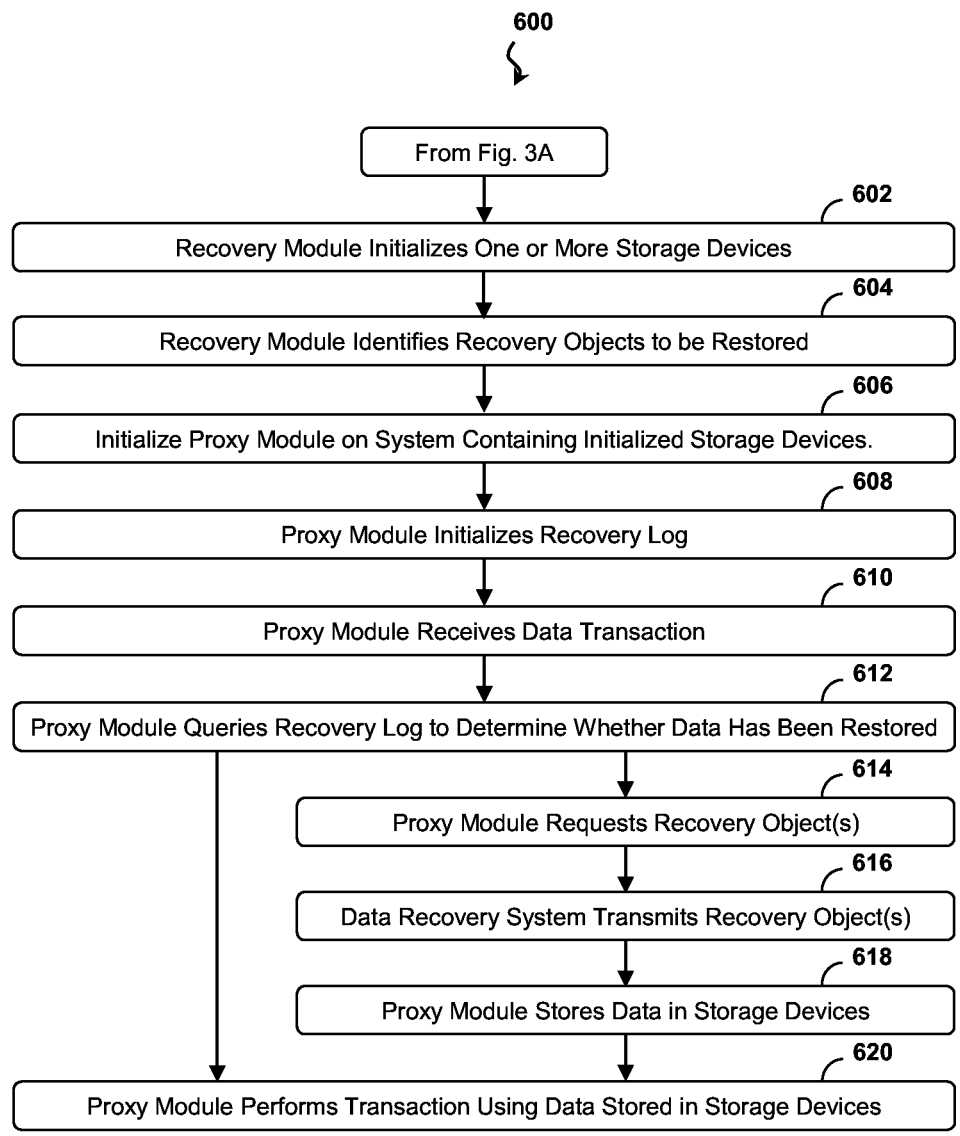
FIG. 6 is a flow diagram of a method of on-demand data restoration from an object-based backup system according to aspects of the present disclosure.
Figure 7:
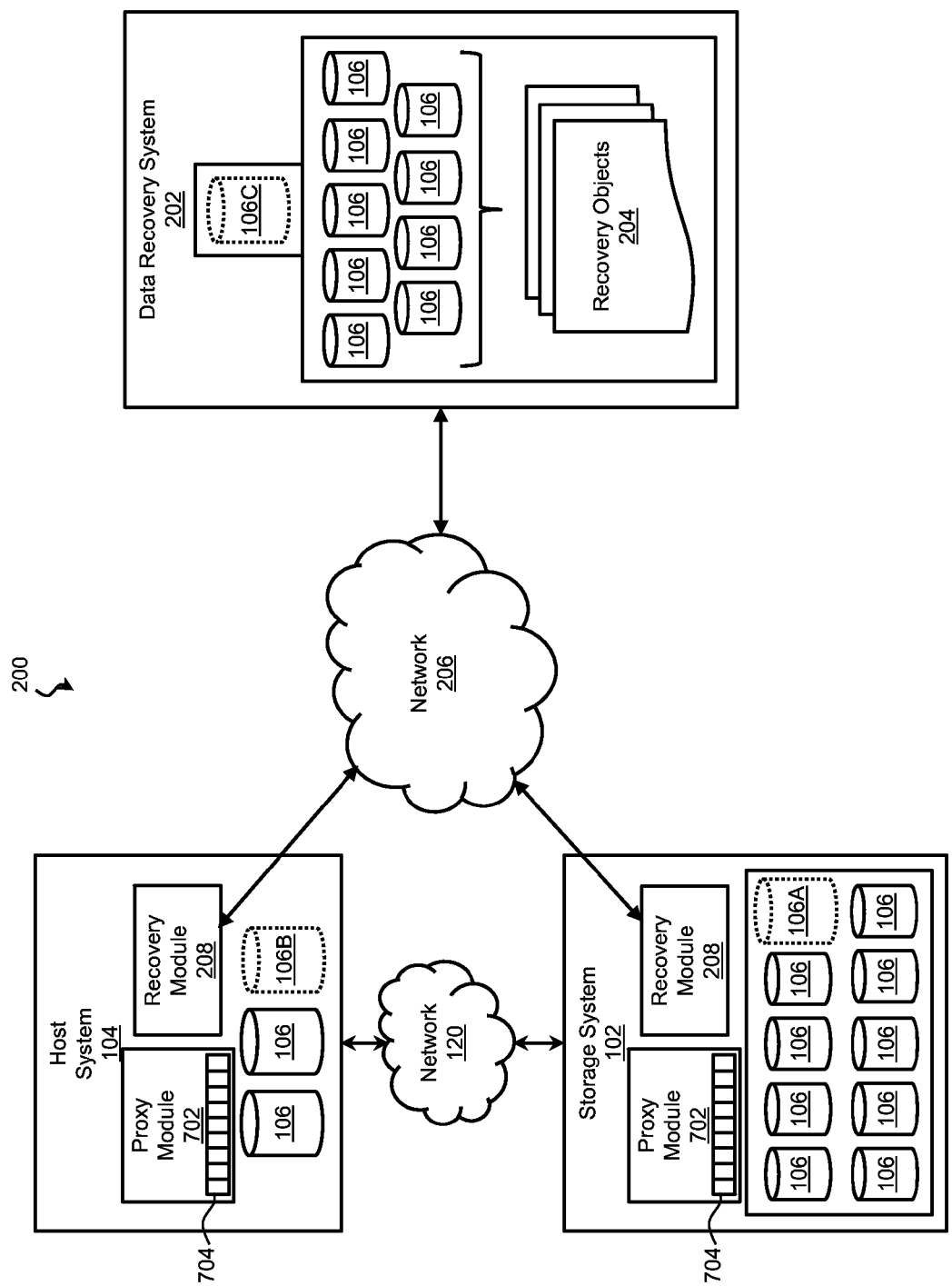
FIG. 7 is a schematic diagram of the computing architecture undergoing the method of on-demand data restoration according to aspects of the present disclosure.

As described above, the recovery module 208 may also restore the data to be recovered to an on-demand provisioned address space. An example of on-demand recovery is described with reference to FIGS. 6 and 7, and may be performed in response to receiving a selection of an on-demand recovery by the recovery module 208 as described in block 326 of FIG. 3A. FIG. 6 is a flow diagram of a method 600 of on-demand data restoration from an object-based backup system according to aspects of the present disclosure. It is understood that additional steps can be provided before, during, and after the steps of method 600, and that some of the steps described can be replaced or eliminated for other embodiments of the method. FIG. 7 is a schematic diagram of the computing architecture 200 undergoing the method 600 of on-demand data restoration according to aspects of the present disclosure.

Referring to block 602 of FIG. 6, the recovery module 208 initializes one or more storage devices 106 upon which to store the restored data. This may be performed substantially as described in block 328 of FIG. 3B. In various examples, the initialized storage devices 106 are directly connected (local) to the storage system 102 (as indicated by storage device 106A), the host 104 (as indicated by storage device 106B), and/or the data recovery system 202 (as indicated by storage device 106C). The initialized storage devices 106 may be local to a different computing system than the system that contains the recovery module 208 performing the recovery technique.

Referring to block 604 of FIG. 6, the recovery module 208 identifies those recovery objects 204 corresponding to the data to be recovered and the recovery point selected in blocks 302, 306, and/or 318. This may be performed substantially as described in block 330 of FIG. 3A. However, instead of indiscriminately restoring the entire address range to the storage devices 106, the only those portions requested in subsequent transactions are recovered, and they are only recovered when they are requested, as explained below.

Referring to block 606 of FIG. 6 and to FIG. 7, the recovery module 208 initializes a proxy module 702 on the computing system having the initialized storage devices (e.g., the storage system 102, the host 104, and/or the data recovery system 202). As described above, the initialized storage devices 106 may be local to a different computing system than the system that contains the recovery module 208 performing the recovery technique, and in one such embodiment, the recovery module 208 is part of a host system 104 while the proxy module 702 is part of a storage system 102.

Referring to block 608 of FIG. 6, the proxy module 702 initializes a recovery log 704 for tracking the address space of the data to be recovered. The recovery log 704 contains a number of entries recording whether data associated with the address space has been recovered and written to the initialized storage devices 106. In its initial state, the recovery log 704 records that no data has been recovered and written to the storage devices 106. However, as requested data is recovered in response to subsequent data transactions, the recovery log 704 records the respective address ranges so that future transactions can be completed using the local storage devices 106. The recovery log 704 may take the form of bitmap, a hash table, a flat file, an associative array, a linked list, a tree, a state table, a relational database, and/or other suitable memory structure. The recovery log 704 may divide the address space according to any granularity, and in various exemplary embodiments divides the address space into 1 kB, 4 kB, 64 kB, and/or 1 MB address ranges.

Referring to block 610 of FIG. 6, the proxy module 702 receives a data transaction directed to the data to be recovered. The data transaction may be received from a program miming on the computing system and/or from another computing system. Referring to block 612 of FIG. 6, the proxy module 702 queries the recovery log 704 to determine whether the target data of the data transaction has been recovered and written to the local storage devices 106.

If not, referring to block 614 of FIG. 6, the proxy module 702 requests one or more recovery objects 204 from the data recovery system 202 in order to restore an address range containing the target data. Referring to block 616 of FIG. 6, the data recovery system 202 transmits one or more recovery objects 204 corresponding to a data extent containing the target data to the proxy module 702. The transmitted recovery objects 204 may include the target data, metadata, and/or other suitable contents. In some embodiments, the data recovery system 202 encrypts, decrypts, compresses, or uncompresses the recovery objects 204 prior to transmission to the proxy module 702.

Referring to block 618 of FIG. 6, the proxy module 702 stores the data of the received recovery objects 204 on the initialized storage devices 106 at block addresses (physical and/or virtual) determined by the data extents of the respective recovery objects 204. In this way, the data is reconstructed at the exact block address it was at when it was backed up using address identifiers incorporated into the recovery objects 204. The proxy module 208 may also store or apply the metadata of the received recovery objects 204. The computing system also updates the recovery log 704 to record that the data and/or metadata is now available on the initialized storage devices 106. The technique proceeds to block 620 of FIG. 6 where the computing system performs the data transaction using the storage devices 106. Likewise, if it is determined in block 612 that the data has already been loaded into the storage devices 106, referring to block 620, the computing system performs the data transaction using the storage devices 106.

On-demand data recovery provides a number of advantages particularly when the connection to the data recovery system 202 is slow. For example, a full recovery of a large data set may take hours or even days. If the user is only interested in recovering a few files from the data set, the overhead associated with recovering the entire address space is considerable. The full recovery unduly burdens the network and may incur unnecessary access charges at the data recovery system 202. By only restoring data as it is requested, on-demand recovery makes more efficient use of the network and is particularly well suited for recovering data over the Internet. Even though there may be a latency penalty when the data is first accessed, because data transactions do not have to wait for the entire address space to be reconstructed, performance may be dramatically improved.

The present embodiments can take the form of an entirely hardware embodiment, an entirely software embodiment, or an embodiment containing both hardware and software elements. Accordingly, it is understood that any operation of the computing systems of the architecture 200 may be implemented by the respective computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and Random Access Memory (RAM).

Thus, the present disclosure provides a system and method for restoring data from an object-based storage system. In some embodiments, the method for restoring data includes identifying an address space of a data set to be recovered. A set of data objects stored by an object-based system is identified that corresponds to the address space of the data set and a selected recovery point. The identified set of data objects is retrieved, and data contained in the retrieved set of data objects is stored to at least one storage device at a block address determined by the retrieved set of data objects to recreate the address space. A data transaction is performed that accesses the data stored on the at least one storage device. In some such embodiments, the retrieving of the identified set of data objects includes providing an HTTP request for the identified set of data objects and receiving an HTTP response containing the identified set of data objects. In some such embodiments, the retrieving of the identified set of data objects is performed based on the set of data objects corresponding to target data of the data transaction. In some such embodiments, the identifying of the set of data objects includes determining a timestamp matching or earlier than the selected recovery point.

In further embodiments, non-transitory machine readable medium has stored thereupon instructions for performing a method of data recovery, including machine executable code, which when executed by at least one machine, causes the machine to: receive a request to recover an address space; request a list of data objects stored by an object-based system corresponding to the address space; determine, based on the list of data objects, a set of recovery points; retrieve, via a network, a set of data objects stored by the object-based system corresponding to the address space and to a selected recovery point of the set of recovery points; and store data contained within the retrieved set of data objects to at least one storage device. In some such embodiments the medium includes further machine executable code, which when executed, causes the machine to: retrieve the set of data objects further based a recovery log that indicates that the set of data objects had not yet been stored to the at least one storage device; and update the recovery log based on the set of data objects being stored to the at least one storage device.

In yet further embodiments, the computing device includes a memory containing a machine readable medium comprising machine executable code having stored thereon instructions for performing a method of data recovery and a processor coupled to the memory. The processor is configured to execute the machine executable code to: identify a set of data objects stored by an object-based system corresponding to a data set to be recovered and a selected recovery point; retrieve the identified set of data objects from the object-based system via a network; and store the retrieved set of data objects to at least one storage device, such that the stored set of data objects recreates an address space of the data set at a point in time corresponding to the selected recovery point. In some such embodiments, the processor is further configured to execute the machine executable code to: retrieve a list of data object names from the object-based system; and identify the set of data objects as corresponding to the data set and the selected recovery point based on at least one of: a data extent identifier or a timestamp included in an object name contained in the list of data object names.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
identifying an address space of a data set to be recovered;
identifying a set of data objects stored by an object-based system and corresponding to an address space for a portion of the data set requested in a data transaction and to a selected recovery point, the object-based system using an object-level protocol for storing data objects and transmitting the stored data objects over a network upon request;
retrieving the identified set of data objects from the object-based system via the network using the object-level protocol;
storing data contained in the retrieved set of data objects to at least one storage device at a block address determined for each data object in the retrieved set of data objects to recreate the corresponding address space of the portion of the data set; and
performing the data transaction that accesses the data stored on the at least one storage device.

2. The method of claim 1, wherein the retrieving of the identified set of data objects includes providing an HTTP request for the identified set of data objects and receiving an HTTP response containing the identified set of data objects.

3. The method of claim 2, wherein the HTTP request and the HTTP response are transmitted over the Internet.

4. The method of claim 1, further comprising identifying target data of the data transaction, wherein the retrieving of the identified set of data objects is performed based on the set of data objects corresponding to the target data.

5. The method of claim 4, further comprising initializing a recovery log recording a recovery status of the address space, wherein the retrieving of the identified set of data objects is further based on the recovery log recording that the identified set of data objects had not yet been stored to the at least one storage device.

6. The method of claim 1, wherein the identifying of the set of data objects includes determining a timestamp matching or earlier than the selected recovery point.

7. The method of claim 6, wherein the timestamp is contained within a name of a data object of the set of data objects.

8. The method of claim 1, further comprising receiving a selection of a quality-of-service option, wherein the storing of the data to the at least one storage device is performed according to the quality-of-service option.

9. The method of claim 8, wherein the quality-of-service option is further based on a prior quality-of-service status recorded in a data object stored by the object-based system.

10. A non-transitory machine readable medium having stored thereupon instructions for performing a method of data recovery, comprising machine executable code, which when executed by at least one machine, causes the machine to:
receive a request to recover an address space of a data set to be recovered;
request a list of data objects stored by an object-based system and corresponding to an address space for a portion of the data set requested in a data transaction, the object-based system using an object-level protocol for storing data objects and transmitting the stored data objects over a network upon request;
determine, based on the list of data objects, a set of recovery points;
retrieve, via the network using the object-level protocol, a set of data objects stored by the object-based system and corresponding to the address space of the portion of the data set and to a selected recovery point of the set of recovery points;
store data contained within the retrieved set of data objects to at least one storage device; and
perform the data transaction that accesses the data stored on the at least one storage device.

11. The non-transitory machine readable medium of claim 10 comprising further machine executable code, which when executed, causes the machine to:
retrieve the set of data objects based on the set of data objects corresponding to a received data transaction.

12. The non-transitory machine readable medium of claim 11 comprising further machine executable code, which when executed, causes the machine to:
retrieve the set of data objects further based on a recovery log that indicates that the set of data objects had not yet been stored to the at least one storage device; and
update the recovery log based on the set of data objects being stored to the at least one storage device.

13. The non-transitory machine readable medium of claim 10, wherein the machine executable code which causes the machine to retrieve the set of data objects includes further machine executable code, which when executed, causes the machine to provide an HTTP request for the set of data objects to the object-based system and to receive an HTTP response containing the set of data objects from the object-based system.

14. The non-transitory machine readable medium of claim 10 comprising further machine executable code, which when executed, causes the machine to:
determine a quality-of-service condition; and
store the data contained within the retrieved set of data objects to the at least one storage device according to the determined quality-of-service condition.

15. The non-transitory machine readable medium of claim 10 comprising further machine executable code, which when executed, causes the machine to:
identify a timestamp of each object of the set of data objects based on the list of data objects.

16. A computing device comprising:
a memory containing a machine readable medium comprising machine executable code having stored thereon instructions for performing a method of data recovery;
a processor coupled to the memory, the processor configured to execute the machine executable code to:
identify a set of data objects stored by an object-based system and corresponding to a portion of a data set to be recovered and a selected recovery point, the object-based system using an object-level protocol for storing data objects and transmitting the stored data objects over a network upon request;
retrieve the identified set of data objects from the object-based system via the network using the object-level protocol; and
store the retrieved set of data objects to at least one storage device, such that the stored set of data objects recreates a corresponding address space of the portion of the data set at a point in time corresponding to the selected recovery point.

17. The computing device of claim 16, wherein the processor is further configured to execute the machine executable code to:
retrieve a list of data object names from the object-based system; and
identify the set of data objects as corresponding to the data set and the selected recovery point based on at least one of: a data extent identifier or a timestamp included in an object name contained in the list of data object names.

18. The computing device of claim 16, wherein the processor is further configured to execute the machine executable code to:
retrieve the set of data objects from the object-based system by providing an HTTP request for the set of data objects via the network and receiving an HTTP response containing the set of data objects via the network.

19. The computing device of claim 16, wherein the processor is further configured to execute the machine executable code to:
retrieve the identified set of data objects from the object-based system based on the set of data objects corresponding to target data of a data transaction received by the computing device.

20. The computing device of claim 19, wherein the processor is further configured to execute the machine executable code to:
retrieve the identified set of data objects from the object-based system further based on a record that indicates that the set of data objects have not previously been retrieved.

* * * * *